US012181822B2

(12) United States Patent
Kubota

(10) Patent No.: US 12,181,822 B2
(45) Date of Patent: Dec. 31, 2024

(54) TUBULAR FIXING MEMBER, FIXING DEVICE, AND IMAGE FORMING APPARATUS

(71) Applicant: FUJIFILM Business Innovation Corp., Tokyo (JP)

(72) Inventor: Ryosuke Kubota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/319,511

(22) Filed: May 18, 2023

(65) Prior Publication Data

US 2024/0210866 A1 Jun. 27, 2024

(30) Foreign Application Priority Data

Dec. 22, 2022 (JP) ................................ 2022-206060

(51) Int. Cl.
*G03G 15/20* (2006.01)

(52) U.S. Cl.
CPC ..... *G03G 15/2057* (2013.01); *G03G 15/2064* (2013.01); *G03G 2215/2038* (2013.01)

(58) Field of Classification Search
None
See application file for complete search history.

(56) References Cited

U.S. PATENT DOCUMENTS 2,297,691 A * 10/1942 Carlson .................... G03G 9/08 399/314
9,268,273 B2 2/2016 Miyahara et al.
2015/0071690 A1* 3/2015 Miyahara ............. G03G 15/206 399/333
2015/0160596 A1* 6/2015 Asaka .................. G03G 15/206 399/333
2015/0261157 A1* 9/2015 Yamano ............. G03G 15/2053 399/329
2016/0018765 A1* 1/2016 Tamura ................ G03G 15/206 399/333

(Continued)

FOREIGN PATENT DOCUMENTS

| | | |
|---|---|---|
| JP | 2015055655 | 3/2015 |
| JP | 2015114367 | 6/2015 |

(Continued)

*Primary Examiner* — Sevan A Aydin
(74) *Attorney, Agent, or Firm* — JCIPRNET

(57) ABSTRACT

A tubular fixing member includes a first layer and a second layer that is disposed in contact with an outer circumferential side of the first layer. In a case where thermal conductivities of the first layer in an axial direction, a circumferential direction, and a thickness direction are denoted by λ1x, λ1y, and λ1z, respectively, and thermal conductivities of the second layer in the axial direction, the circumferential direction, and the thickness direction are denoted by λ2x, λ2y, and λ2z, respectively, the following requirements (1), (2), and (3) are satisfied.

Requirement (1): $\lambda 1x < \lambda 1z$ and $\lambda 1y < \lambda 1z$

Requirement (2): $\lambda 1z > \lambda 2z$

Requirement (3): $\lambda 2x > \lambda 2y$ and $\lambda 2x > \lambda 2z$

13 Claims, 4 Drawing Sheets

(56) References Cited

U.S. PATENT DOCUMENTS

| | | | | |
|---|---|---|---|---|
| 2016/0018767 | A1* | 1/2016 | Takada | G03G 15/206 399/334 |
| 2019/0033762 | A1* | 1/2019 | Ikegami | G03G 15/206 |
| 2019/0377290 | A1* | 12/2019 | Kitano | G03G 15/2057 |
| 2020/0019100 | A1* | 1/2020 | Asaka | G03G 15/2064 |
| 2022/0334522 | A1* | 10/2022 | Miyahara | G03G 15/2017 |

FOREIGN PATENT DOCUMENTS

| | | | | | |
|---|---|---|---|---|---|
| JP | 2019008102 | A | * | 1/2019 | B32B 1/08 |
| JP | 2023059123 | A | * | 4/2023 | G03G 15/2053 |

* cited by examiner

TUBULAR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-206060 filed Dec. 22, 2022.

BACKGROUND

(i) Technical Field

The present disclosure relates to a tubular fixing member, a fixing device, and an image forming apparatus.

(ii) Related Art

JP2015-055655A discloses a pressure rotating body including an elastic layer. The pressure rotating body forms a nip, at which a recording material carrying an image is heated while being sandwiched and transported, together with a heating member, and thermal conductivities of the elastic layer in a longitudinal direction and a circumferential direction are 6 times or more and 900 times or less a thermal conductivity of the elastic layer in a thickness direction.

JP2015-114367A discloses an elastic roller including an elastic layer in which needle-shaped fillers are oriented in an axial direction and a ratio of the fillers oriented in the axial direction is substantially identical over an entire region.

SUMMARY

Aspects of non-limiting embodiments of the present disclosure relate to a tubular fixing member in which a temperature variation is less likely to occur on an outer circumferential surface.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the object include the following aspect.

According to an aspect of the present disclosure, there is provided a tubular fixing member including: a first layer; and a second layer that is disposed in contact with an outer circumferential side of the first layer, in which in a case where thermal conductivities of the first layer in an axial direction, a circumferential direction, and a thickness direction are denoted by λ1x, λ1y, and λ1z, respectively, and thermal conductivities of the second layer in the axial direction, the circumferential direction, and the thickness direction are denoted by λ2x, λ2y, and λ2z, respectively, the following requirements (1), (2), and (3) are satisfied.

$$\text{Requirement (1): } \lambda 1x < \lambda 1z \text{ and } \lambda 1y < \lambda 1z$$

$$\text{Requirement (2): } \lambda 1z > \lambda 2z$$

$$\text{Requirement (3): } \lambda 2x > \lambda 2y \text{ and } \lambda 2x > \lambda 2z$$

BRIEF DESCRIPTION OF THE DRAWINGS

Exemplary embodiment(s) of the present invention will be described in detail based on the following figures, wherein.

DETAILED DESCRIPTION

Figure 1:
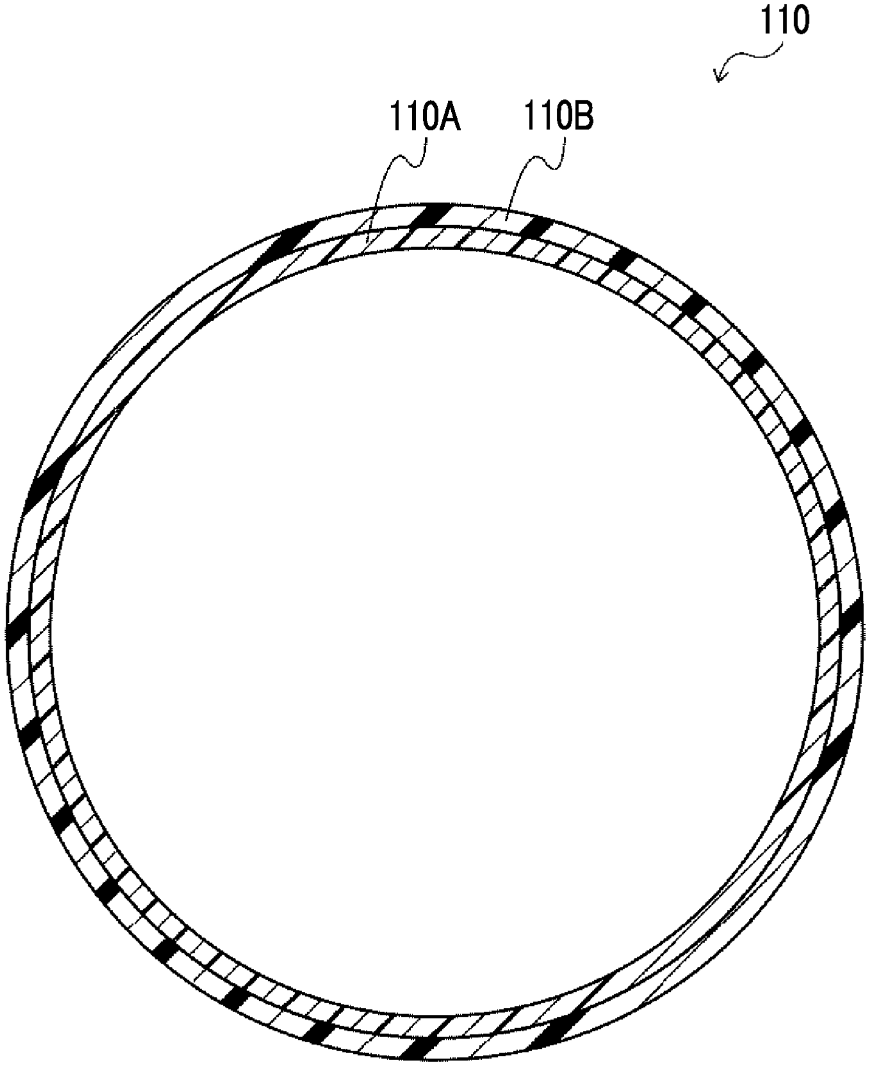
FIG. 1 is a schematic cross-sectional view showing an example of a tubular fixing member according to an exemplary embodiment of the present disclosure.

Exemplary embodiments of the present disclosure will be described below. The description and examples of these exemplary embodiments illustrate the exemplary embodiments and do not limit the scopes of the exemplary embodiments.

A numerical range indicated using "to" in the present disclosure indicates a range that includes numerical values written in the front and rear of "to" as a minimum value and a maximum value.

With regard to numerical ranges described stepwise in the present disclosure, an upper limit or a lower limit described in one numerical range may be replaced with an upper limit or a lower limit of another numerical range described stepwise. Further, with regard to a numerical range described in the present disclosure, the upper limit or the lower limit of the numerical range may be replaced with values shown in Examples.

In the present disclosure, the term "step" includes not only an independent step but also a case where the intended purpose of the step is achieved even in a case where the step cannot be clearly distinguished from another step.

In the case where an exemplary embodiment is described with reference to the drawings in the present disclosure, the configuration of the exemplary embodiment is not limited to the configuration shown in the drawings. In addition, the sizes of members in each drawing are conceptual, and a relative relationship between the sizes of the members is not limited thereto.

In the present disclosure, each component may include a plurality of types of corresponding substances. In the case where the amount of each component contained in a composition is mentioned in the present disclosure and a plurality of types of substances corresponding to each component are present in the composition, the amount of each component means a total amount of the plurality of types of substances present in the composition unless otherwise specified.

In the present disclosure, a plurality of types of particles corresponding to each component may be included. In a case where a plurality of types of particles corresponding to each component are present in the composition, the particle diameter of each component means a value for a mixture of the plurality of types of particles present in the composition unless otherwise specified.

In the present disclosure, "axial direction" of a tubular fixing member means a direction in which a rotation axis of the tubular fixing member extends and "circumferential direction" of the tubular fixing member means a rotation direction of the tubular fixing member.

Tubular Fixing Member

A tubular fixing member according to an exemplary embodiment of the present disclosure includes a first layer and a second layer that is disposed in contact with an outer circumferential side of the first layer. In a case where the thermal conductivities of the first layer in the axial direction, the circumferential direction, and a thickness direction are denoted by λ1x, λ1y, and λ1z, respectively, and the thermal conductivities of the second layer in the axial direction, the circumferential direction, and the thickness direction are denoted by λ2x, λ2y, and λ2z, respectively, the following requirements (1), (2), and (3) are satisfied.

$$\text{Requirement (1): } \lambda 1x < \lambda 1z \text{ and } \lambda 1y < \lambda 1z$$

$$\text{Requirement (2): } \lambda 1z > \lambda 2z$$

$$\text{Requirement (3): } \lambda 2x > \lambda 2y \text{ and } \lambda 2x > \lambda 2z$$

The tubular fixing member according to the exemplary embodiment of the present disclosure includes at least one set of first and second layers that satisfy the requirements (1), (2), and (3), and the second layer is disposed in contact with an outer circumferential side of the first layer.

In the present disclosure, "first layer" and "second layer" mean layers that satisfy the above-mentioned relationship.

A mechanism in which a temperature variation is less likely to occur on an outer circumferential surface of the tubular fixing member according to the exemplary embodiment of the present disclosure is presumed as described below.

In a tubular fixing member satisfying the requirement (1), heat is more easily transferred in a thickness direction (that is, to the outer circumferential side) than in a plane direction in a first layer that is closer to an inner circumferential side (that is, on a heat source side) than a second layer. Further, in a tubular fixing member satisfying the requirement (2), heat is transferred from a first layer to a second layer without delay and is easily stored in the second layer. Furthermore, in a tubular fixing member satisfying the requirement (3), heat is easily transferred in the second layer in the axial direction and temperature uniformity in the axial direction is facilitated in the second layer. Accordingly, a temperature variation is less likely to occur on the outer circumferential surface of the tubular fixing member according to the exemplary embodiment of the present disclosure.

Satisfying the requirement (1) can be realized in a case where, for example, fillers having an anisotropic shape are arranged in the thickness direction of the first layer.

Satisfying the requirement (3) can be realized in a case where, for example, fillers having an anisotropic shape are arranged in the axial direction of the second layer.

Satisfying the requirement (2) can be realized in a case where, for example, fillers having an anisotropic shape are arranged in the thickness direction of the first layer and fillers having an anisotropic shape are arranged in the axial direction of the second layer. Satisfying the requirement (2) can be realized depending on, for example, the types and amounts of the respective fillers included in the first layer and the second layer.

A method of obtaining the thermal conductivities of the first layer and the second layer is as follows.

The first layer or the second layer is cut into a square having a length of 2 mm in the axial direction and a length of 2 mm in the circumferential direction, and this is used as a sample for measurement. The sample is placed on a thermal diffusivity measuring device, the thermal diffusivity of the sample is measured at a room temperature (25° C.±3° C.), and the thermal diffusivity, density, and specific heat are multiplied together, so that the thermal conductivity (W/m·K) of the sample is calculated. The thermal conductivities of the sample in the axial direction, the circumferential direction, and the thickness direction are measured depending on the orientation of the sample in a case where the sample is interposed between a pair of measurement terminals of the thermal diffusivity measuring device.

The tubular fixing member according to the exemplary embodiment of the present disclosure may include at least one set of first and second layers, and may further include layers other than the first layer and the second layer. Examples of the other layers include a layer (for example, a base layer) that is disposed on the inner circumferential side of the first layer and a layer (for example, a surface layer) that is disposed on the outer circumferential side of the second layer. An adhesive layer may be provided between the respective layers.

The tubular fixing member according to the exemplary embodiment of the present disclosure may include a plurality of sets of the first and second layers. For example, a second set of first and second layers may overlap the outer circumferential side of a first set of first and second layers. Further, a third set of first and second layers may overlap the outer circumferential side of the second set of first and second layers. In this case, the first layers of the respective sets may be identical to each other or different from each other in terms of components, thickness, and thermal conductivity, and the second layers of the respective sets may be identical to each other or different from each other in terms of components, thickness, and thermal conductivity.

Examples of the shape of the tubular fixing member according to the exemplary embodiment of the present disclosure include a cylindrical shape and a belt shape.

FIG. 1 is a schematic cross-sectional view showing an example of the layer configuration of a tubular fixing member according to an exemplary embodiment of the present disclosure.

The tubular fixing member 110 shown in FIG. 1 includes a first layer 110A and a second layer 110B. The second layer 110B is disposed in contact with an outer circumferential side of the first layer 110A. The first layer 110A and the second layer 110B are layers that satisfy a requirement (1), a requirement (2), and a requirement (3).

Another layer may be provided on an inner circumferential side of the first layer 110A. Another layer may be provided on an outer circumferential side of the second layer 110B. The first layer 110A and the second layer 110B may alternately overlap.

Each layer of the tubular fixing member according to the exemplary embodiment of the present disclosure will be described in detail below.

First Layer and Second Layer

It is preferable that each of the first and second layers may be a resin layer including a resin and fillers in terms of bending durability.

It is preferable that the resin forming the resin layer including the resin and the fillers has heat resistance, and examples of the resin having heat resistance include a polyimide resin, a polyamide resin, a polyamideimide resin, a thermotropic liquid crystal polymer, a fluororesin, a silicone resin, fluororubber, silicone rubber, fluorosilicone rubber, and the like.

The type of the resin included in the first layer and the type of the resin included in the second layer may be identical to each other or different from each other. An example of the tubular fixing member according to the exemplary embodiment includes a form in which the type of the resin included in the first layer and the type of the resin included in the second layer may be identical to each other.

It is preferable that the fillers forming the resin layer including the resin and the fillers have thermal conductivity, and examples of the filler having thermal conductivity include: carbon materials, such as carbon black, a carbon fiber, or a carbon nanotube; metal oxide particles, such as titanium oxide, alumina, and zinc oxide; fumed silica; precipitated silica; diatom earth; pulverized quartz; boron nitride; and the like.

The shape of the filler is not limited, and may be any one of a spherical shape, a cubic shape, a plate shape, a columnar shape, a needle shape, a rod shape, a flake shape, and the like. In terms of imparting anisotropy to the thermal conductivity of the first or second layer, it is preferable that fillers having an anisotropic shape, such as a plate shape, a columnar shape, a needle shape, a rod shape, or a flake shape, are used.

The filler included in the first layer and the filler included in the second layer may be identical to each other or different from each other in terms of a material and a shape. An example of the tubular fixing member according to the exemplary embodiment includes a form in which the filler included in the first layer and the filler included in the second layer may be identical to each other in terms of a material and a shape.

Various additives may be contained in the resin layer including the resin and the filler. Examples of the additives include softeners (paraffin and the like), processing aids (stearic acid and the like), anti-aging agents (amine and the like), cross-linking agents, and the like.

In a case where the first layer is the resin layer including the resin and the filler, it is preferable that a filler content is higher in terms of improving the thermal conductivity of the first layer. However, in a case where a filler content is excessively high, it is difficult to impart anisotropy to the thermal conductivity of the first layer.

In terms of a fact that the first layer has appropriate thermal conductivity together with anisotropy, a filler content is preferably 0.1% by volume or more and 60% by volume or less, more preferably 1% by volume or more and 50% by volume or less, still more preferably 5% by volume or more and 40% by volume or less, and even more preferably 10% by volume or more and 30% by volume or less with respect to the total volume of the first layer.

Further, in terms of the bending durability of the first layer, it is preferable that a filler content is not excessively high, and a filler content is preferably 60% by volume or less, more preferably 50% by volume or less, still more preferably 40% by volume or less, and even more preferably 30% by volume or less with respect to the total volume of the first layer.

In a case where the second layer is the resin layer including the resin and the filler, it is preferable that a filler content is higher in terms of improving the thermal conductivity of the second layer. However, in a case where a filler content is excessively high, it is difficult to impart anisotropy to the thermal conductivity of the second layer.

In terms of a fact that the second layer has appropriate thermal conductivity together with anisotropy, a filler content is preferably 0.1% by volume or more and 60% by volume or less, more preferably 1% by volume or more and 50% by volume or less, still more preferably 5% by volume or more and 40% by volume or less, and even more preferably 10% by volume or more and 30% by volume or less with respect to the total volume of the second layer.

Further, in terms of the bending durability of the second layer, it is preferable that a filler content is not excessively high, and a filler content is preferably 60% by volume or less, more preferably 50% by volume or less, still more preferably 40% by volume or less, and even more preferably 30% by volume or less with respect to the total volume of the second layer.

The requirement (1) ($\lambda 1x<\lambda 1z$ and $\lambda 1y<\lambda 1z$), that is, a property in which the first layer more easily conducts heat in the thickness direction than in the plane direction can be realized in a case where, for example, fillers having an anisotropic shape are arranged in the thickness direction of the first layer.

$\lambda 1x$ is preferably 0.2 W/m·K or more and 1.4 W/m·K or less, more preferably 0.4 W/m·K or more and 1.2 W/m·K or less, and still more preferably 0.6 W/m·K or more and 1.0 W/m·K or less.

$\lambda 1y$ is preferably 0.2 W/m·K or more and 1.4 W/m·K or less, more preferably 0.4 W/m·K or more and 1.2 W/m·K or less, and still more preferably 0.6 W/m·K or more and 1.0 W/m·K or less.

$\lambda 1z$ is preferably 0.6 W/m·K or more and 2.0 W/m·K or less, more preferably 0.8 W/m·K or more and 1.8 W/m·K or less, and still more preferably 1.0 W/m·K or more and 1.6 W/m·K or less.

The thermal conductivity $\lambda 1z$ of the first layer in the thickness direction and the thermal conductivity $\lambda 2z$ of the second layer in the thickness direction satisfy the requirement (2) ($\lambda 1z>2z$).

In terms of suppressing the temperature variation of the outer circumferential surface of the tubular fixing member, a ratio $\lambda 1z/\lambda 2z$ of $\lambda 1z$ to $\lambda 2z$ is preferably 1.1 or more and 2.2 or less, more preferably 1.2 or more and 2.0 or less, and still more preferably 1.3 or more and 1.8 or less.

The requirement (3) ($\lambda 2x>\lambda 2y$ and $\Delta 2x>\lambda 2z$), that is, a property in which the second layer easily conducts heat in the axial direction can be realized in a case where, for example, fillers having an anisotropic shape are arranged in the axial direction of the second layer.

$\lambda 2x$ is preferably 0.6 W/m·K or more and 2.0 W/m·K or less, more preferably 0.8 W/m·K or more and 1.8 W/m·K or less, and still more preferably 1.0 W/m·K or more and 1.6 W/m·K or less.

$\lambda 2y$ is preferably 0.2 W/m·K or more and 1.4 W/m·K or less, more preferably 0.4 W/m·K or more and 1.2 W/m·K or less, and still more preferably 0.6 W/m·K or more and 1.0 W/m·K or less.

$\lambda 2z$ is preferably 0.2 W/m·K or more and 1.4 W/m·K or less, more preferably 0.4 W/m·K or more and 1.2 W/m·K or less, and still more preferably 0.6 W/m·K or more and 1.0 W/m·K or less.

An average thickness T1 of the first layer is preferably 10 μm or more and 150 μm or less, more preferably 20 μm or more and 120 μm or less, and still more preferably 30 μm or more and 100 μm or less.

An average thickness T2 of the second layer is preferably 1 μm or more and 100 μm or less, more preferably 3 μm or more and 50 μm or less, and still more preferably 5 μm or more and 30 μm or less.

It is preferable that the second layer is thinner than the first layer. In a case where the first and second layers are to be compared with each other, the average thicknesses of the first and second layers are compared with each other. That is, it is preferable that the average thickness T2 of the second layer and the average thickness T1 of the first layer satisfy a relationship of "T2<T1".

In terms of transferring heat to the outer circumferential surface of the tubular fixing member without delay, it is preferable that the second layer is a layer having thermal conductivity lower than the thermal conductivity of the first layer and the second layer having lower thermal conductivity is relatively thin.

In terms of the total thermal conductivity of the first and second layers, a ratio of a thickness of the second layer to a total thickness of the first and second layers is preferably 1% or more and less than 50%, more preferably 1% or more and less than 40%, still more preferably 1% or more and less than 30%, even more preferably 1% or more and less than 20%, and particularly preferably 1% or more and less than 10%.

The ratio of the thickness of the second layer is calculated on the basis of the average thickness of each of the first and second layers.

Each of the average thicknesses of the first and second layers is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Surface Layer

The tubular fixing member according to the exemplary embodiment of the present disclosure may include a surface layer, which serves as an outer circumferential surface, on the outer circumferential side of the second layer.

It is desirable that the surface layer contains a release material having heat resistance. Examples of the release material having heat resistance include a fluororesin. Examples of the fluororesin include a tetrafluoroethylene-perfluoroalkyl vinyl ether copolymer (PFA), polytetrafluoroethylene (PTFE), a tetrafluoroethylene-hexafluoropropylene copolymer (FEP), polyethylene tetrafluoroethylene (ETFE), polyvinylidene fluoride (PVDF), polychlorotrifluoroethylene (PCTFE), vinyl fluoride (PVF), and the like.

Various additives may be contained in the surface layer. Examples of the additives include fillers (calcium carbonate and the like), functional fillers (alumina and the like), softener (paraffin and the like), processing aids (stearic acid and the like), anti-aging agents (amine and the like), cross-linking agents, and the like.

An average thickness of the surface layer is preferably 5 μm or more and 30 μm or less, more preferably 10 μm or more and 25 μm or less, and still more preferably 15 μm or more and 20 μm or less.

The average thickness of the surface layer is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Base Layer

The tubular fixing member according to the exemplary embodiment of the present disclosure may include a base layer, which serves as an inner circumferential surface, on the inner circumferential side of the first layer.

Examples of a material of the base layer include: resins, such as a polyimide resin, a polyamide resin, a polyamide-imide resin, and a lybenzimidazole resin; metals, such as aluminum, copper, stainless steel (SUS), iron, and nickel; and the like. In terms of bending durability, it is preferable that the base layer is made of a resin.

Additives, such as a reinforcing agent (carbon black or the like), a filler (calcium carbonate or the like), an antistatic agent, and a release agent, may be contained in the base layer made of a resin.

In terms of durability and thermal conductivity, an average thickness of the base layer is preferably 30 μm or more and 200 μm or less, more preferably 40 μm or more and 150 μm or less, and still more preferably 50 μm or more and 100 μm or less.

The average thickness of the base layer is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Method of Manufacturing Tubular Fixing Member

Examples of a method of manufacturing the tubular fixing member according to the exemplary embodiment of the present disclosure include the following method.

The outer circumferential surface of a cylindrical mold or the cylindrical base layer is coated with a first layer-forming liquid composition and the first layer-forming liquid composition is dried to form the first layer. Then, the outer circumferential surface of the first layer is coated with a second layer-forming liquid composition and the second layer-forming liquid composition is dried to form the second layer. In a case where the cylindrical mold is used, the cylindrical mold under the first layer is pulled out.

Examples of a method of arranging fillers having an anisotropic shape in the thickness direction of the first layer to satisfy the requirement (1) include a method of coating the outer circumferential surface of a cylindrical mold or the cylindrical base layer with a first layer-forming liquid composition using a flow-coating method (also called a "spiral coating method"). It is preferable that the flow-coating method is specifically a flow-coating method of coating the cylindrical mold or the cylindrical base layer by making the axial direction of the cylindrical mold or the cylindrical base layer be parallel to a horizontal direction, rotating the cylindrical mold or the cylindrical base layer, and causing the first layer-forming liquid composition to flow down.

Examples of a method of arranging fillers having an anisotropic shape in the axial direction of the second layer to satisfy the requirement (3) include dip coating (also call a "dip-coating method") of coating the outer circumferential surface of the first layer with the second layer-forming liquid composition by making the axial direction of the first layer be parallel to a direction of gravity, dipping the first layer into the second layer-forming liquid composition, and then pulling up the first layer from the second layer-forming liquid composition in a state where the axial direction of the first layer is parallel to the direction of gravity.

In a case where the tubular fixing member includes a surface layer, for example, the outer circumferential surface of the second layer is coated with a surface layer-forming liquid composition and the surface layer-forming liquid composition is dried to form the surface layer or a tubular member, which is prepared in advance and serves as a surface layer, covers the outer circumferential surface of the second layer to form the surface layer. For example, a fluororesin tube is suitable for the tubular member serving as the surface layer. A physical or chemical etching treatment, such as liquid ammonia treatment, plasma discharge treatment, or excimer laser treatment, may be performed on an inner surface of the fluororesin tube for the purpose of improving adhesiveness to the second layer.

The tubular fixing member according to the exemplary embodiment of the present disclosure may be a fixing belt or may be a fixing roller.

In a case where the tubular fixing member according to the exemplary embodiment of the present disclosure is a fixing belt, the tubular fixing member may be applied to either a heating belt or a pressure belt. In a case where the tubular fixing member according to the exemplary embodiment of the present disclosure is a fixing roller, the tubular fixing member may be applied to either a heating roller or a pressure roller.

Fixing Device

A fixing device according to an exemplary embodiment of the present disclosure includes a first rotating body and a second rotating body that is disposed in contact with an outer surface of the first rotating body, and causes a recording medium in which a toner image is formed on a surface to pass through a contact portion between the first rotating body and the second rotating body to fix the toner image to the recording medium. At least one of the first rotating body or the second rotating body is the tubular fixing member according to the exemplary embodiment of the present disclosure.

Examples of the fixing device according to the exemplary embodiment of the present disclosure include a first exemplary embodiment and a second exemplary embodiment.

A fixing device according to the first exemplary embodiment includes a heating roller and a pressure belt, and at least one of the heating roller or the pressure belt is the tubular fixing member according to the exemplary embodiment of the present disclosure.

A fixing device according to a second exemplary embodiment includes a heating belt and a heating roller, and at least one of the heating belt or the pressure roller is the tubular fixing member according to the exemplary embodiment of the present disclosure.

First Exemplary Embodiment

Figure 2:
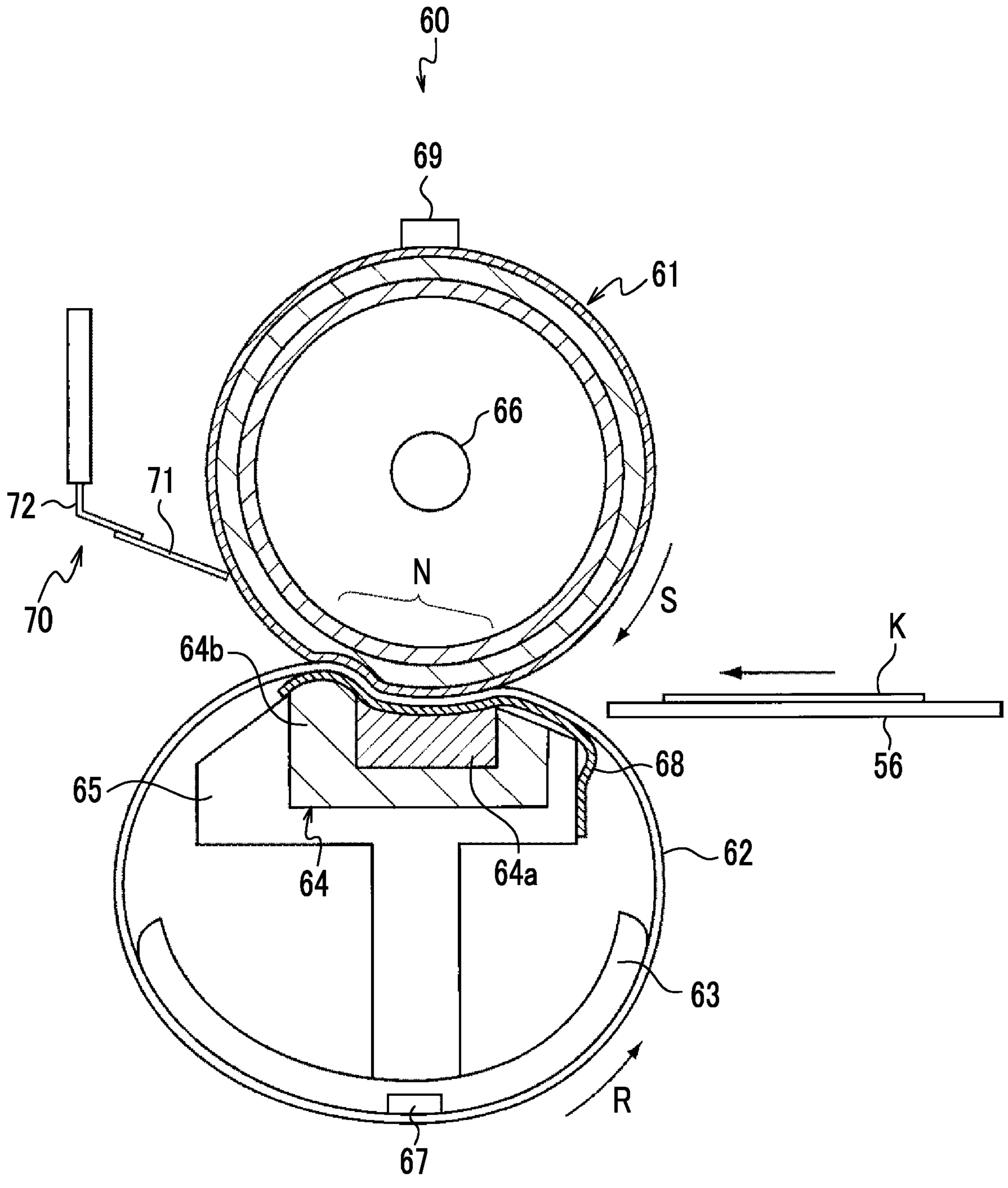
FIG. 2 is a schematic configuration diagram showing an example of a fixing device according to a first exemplary embodiment of the present disclosure.

FIG. 2 is a schematic diagram showing a fixing device 60 according to a first exemplary embodiment.

The fixing device 60 includes a heating roller 61 (an example of the first rotating body) and a pressure belt 62 (an example of the second rotating body).

A halogen lamp 66 (an example of heating means) is disposed in the heating roller 61. A temperature-sensitive element 69 is disposed in contact with the surface of the heating roller 61. The lighting of the halogen lamp 66 is controlled on the basis of a temperature value measured by the temperature-sensitive element 69, so that the surface temperature of the heating roller 61 is maintained at a target set temperature (for example, 150° C.).

The pressure belt 62 is rotatably supported by a pressing pad 64 and a belt traveling guide 63 that are disposed inside the pressure belt 62.

The pressing pad 64 presses the pressure belt 62 against the heating roller 61. The pressure belt 62 is pressed against the heating roller 61 by the pressing pad 64, so that a nip region N (nip portion) is formed.

The pressing pad 64 includes a nip member **64*a* and a nip member 64*b*. The nip member 64*a* is disposed on the entrance side of the nip region N to ensure a wide nip region N. The nip member 64*b* is disposed on the exit side of the nip region N to cause strain on the heating roller 61** and to facilitate the peeling of a recording medium.

A sheet-like sliding member 68 is disposed between the pressing pad 64 and the pressure belt 62 to reduce sliding resistance between the inner circumferential surface of the pressure belt 62 and the pressing pad 64. The pressing pad 64 and the sliding member 68 are held by a holding member 65 made of metal. The belt traveling guide 63 is mounted on the holding member 65. A lubricant supply device 67, which is means for supplying a lubricant (oil) to the inner circumferential surface of the pressure belt 62, is mounted on the belt traveling guide 63.

A peeling member 70 is auxiliary means for peeling off a recording medium from the fixing device 60, and is disposed on the downstream side of the nip region N. The peeling member 70 includes a peeling claw 71 and a holding member 72. The peeling claw 71 is held at a position close to the heating roller 61 by the holding member 72.

The heating roller 61 is rotationally driven by a drive motor (not shown). The heating roller 61 is rotated in a direction of an arrow S by the drive motor, and the pressure belt 62 is rotated in a direction of an arrow R while following the rotation of the heating roller 61. A sheet K (an example of a recording medium) including an unfixed toner image is guided by a guide 56, and is transported to the nip region N. When the sheet K passes through the nip region N, the toner image on the sheet K is fixed by pressure and heat.

Second Exemplary Embodiment

Figure 3:
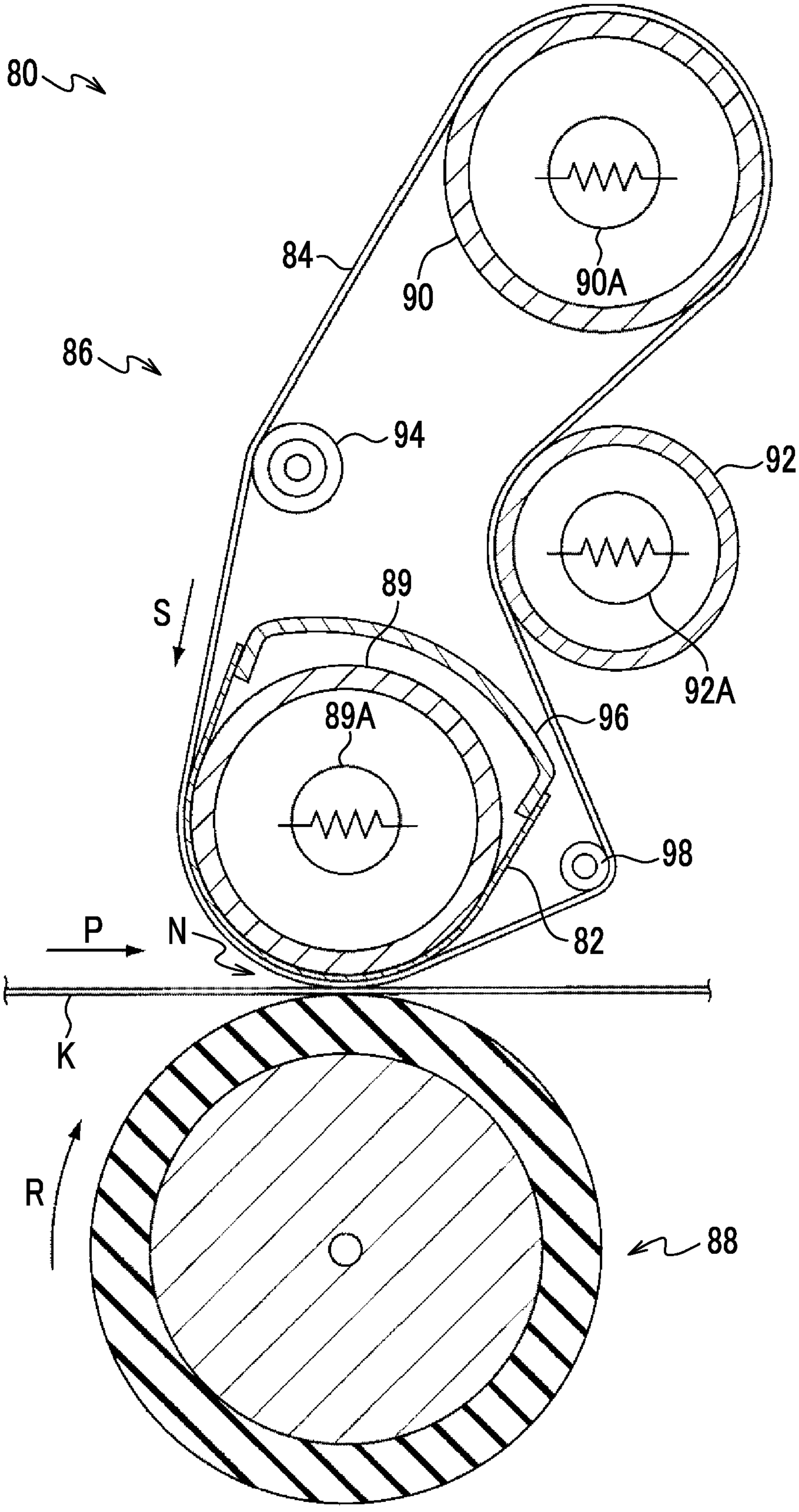
FIG. 3 is a schematic configuration diagram showing an example of a fixing device according to a second exemplary embodiment of the present disclosure.

FIG. 3 is a schematic diagram showing a fixing device 80 according to a second exemplary embodiment.

The fixing device 80 includes a fixing belt module 86 that includes a heating belt 84 (an example of the first rotating body), and a pressure roller 88 (an example of the second rotating body) that is disposed to be pressed against the heating belt 84 (fixing belt module 86).

A nip region N (nip portion) is formed at a contact portion between the heating belt 84 (fixing belt module 86) and the pressure roller 88.

The fixing belt module 86 includes a heating belt 84, a heating pressing roller 89, a support roller 90, a support roller 92, a posture correction roller 94, and a support roller 98. The heating belt 84 is wound around the heating pressing roller 89 and the support roller 90. The heating pressing roller 89 is rotationally driven by a drive motor (not shown), and presses the heating belt 84 against the pressure roller 88 from the inner circumferential surface of the heating belt 84. The support roller 92 is disposed outside the heating belt 84, and defines a circumferential path of the heating belt 84. The posture correction roller 94 corrects the posture of the heating belt 84 between the support roller 90 and the heating pressing roller 89, and suppresses the meandering of the heating belt 84. The support roller 98 applies tension to the heating belt 84 from the inner circumferential surface of the heating belt 84 on the downstream side of the nip region N.

A sheet-like sliding member 82 is disposed between the heating belt 84 and the heating pressing roller 89 to reduce sliding resistance between the inner circumferential surface of the heating belt 84 and the heating pressing roller 89. The sliding member 82 is disposed in a state where both ends of the sliding member 82 are supported by a support member 96.

A halogen heater 89A (an example of heating means) is disposed in the heating pressing roller 89, and heats the heating belt 84 from the inner circumferential surface side of the heating belt 84.

A halogen heater 90A (an example of heating means) is disposed in the support roller 90, and heats the heating belt 84 from the inner circumferential surface side of the heating belt 84.

A halogen heater 92A (an example of heating means) is disposed in the support roller 92, and heats the heating belt 84 from the outer circumferential surface side of the heating belt 84.

The pressure roller 88 is rotatably supported, and is provided to be pressed against a portion of the heating belt 84, which is wound around the heating pressing roller 89, by biasing means (not shown). The heating belt 84 is rotationally moved in a direction of an arrow S as the heating pressing roller 89 is rotationally driven, and the pressure roller 88 is rotationally moved in a direction of an arrow R while following the rotational movement of the heating belt 84.

A sheet K (an example of a recording medium) including an unfixed toner image is transported in a direction of an arrow P, and is guided to the nip region N of the fixing device 80. When the sheet K passes through the nip region N, the toner image on the sheet K is fixed by pressure and heat.

Image Forming Apparatus

An image forming apparatus according to an exemplary embodiment of the present disclosure includes an image holding body, a charging device that changes a surface of the image holding body, an electrostatic latent image forming device that forms an electrostatic latent image on the changed surface of the image holding body, a developing device that develops the electrostatic latent image formed on the surface of the image holding body with a developer containing toner to form a toner image, a transfer device that transfers the toner image onto a surface of a recording medium, and the fixing device according to the exemplary embodiment of the present disclosure that fixes the toner image to the recording medium. The fixing device may be a cartridge that can be attached to and detached from the image forming apparatus.

Figure 4:
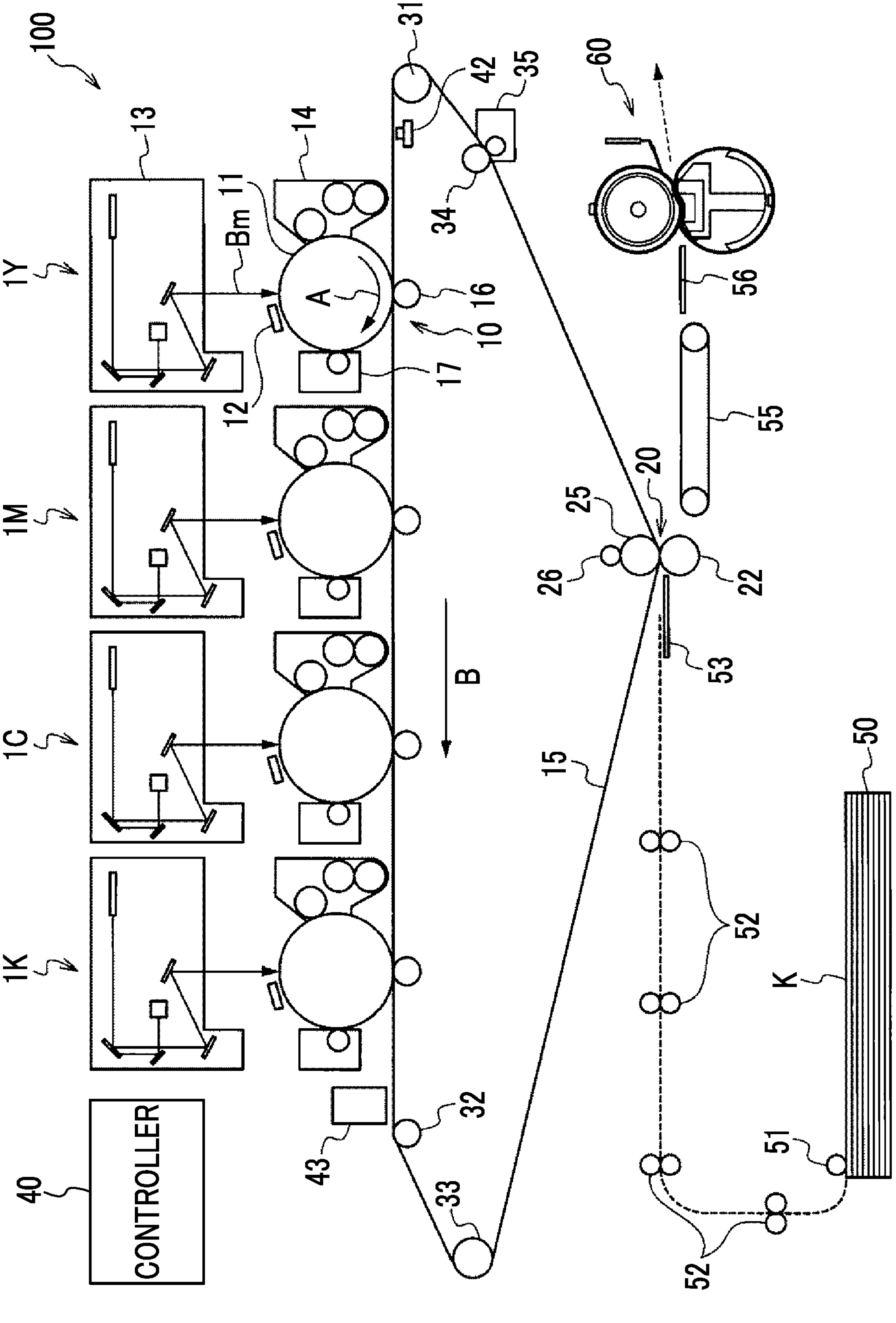
FIG. 4 is a schematic configuration diagram showing an example of an image forming apparatus according to an exemplary embodiment of the present disclosure.

FIG. 4 is a schematic diagram showing the configuration of the image forming apparatus 100 according to the present exemplary embodiment. The image forming apparatus 100 includes the fixing device 60 according to the first exemplary embodiment described above. The image forming apparatus 100 may include the fixing device 80 according to the second exemplary embodiment described above instead of the fixing device 60.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow A.

A charging unit 12 (an example of a charging device), a laser exposure unit 13 (an example of an electrostatic latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt made of a material in which an antistatic agent, such as carbon black, is added to a resin, such as polyimide or polyamide. The intermediate transfer belt 15 has a volume resistivity of, for example, $1\times10^6$ Ω·cm or more and $1\times10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity. The same applies hereinafter) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is blended) fixed around the shaft. The primary transfer roller 16 has a volume resistivity of, for example, $1\times10^{7.5}$ Ω·cm or more and $1\times10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is blended) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^{7}$Ω/□ or more and $1\times10^{10}$Ω/□ or less, and has a hardness of, for example, 70° (Asker C manufactured by Kobunshi Keiki Co., Ltd., The same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as transport means for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the fixing device 60.

The fixing entrance guide 56 guides the sheet K to the fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

EXAMPLES

The tubular fixing member according to the exemplary embodiment of the present disclosure will be described in detail below using examples, but the tubular fixing member according to the exemplary embodiment of the present disclosure is not limited to these examples at all.

In the following description, all of "part" and "%" are based on mass unless otherwise specified.

In the following description, preparation, processing, manufacture, and the like are performed at room temperature (25° C.±3° C.) unless otherwise specified.

Manufacture of Fixing Belt

Example 1

Preparation of Coating Liquid

A polyamic acid solution (TX-HMM manufactured by Unitika Ltd., the concentration of solid contents: 18% by mass, a solvent: NMP) and carbon nanotubes (VGCF (registered trademark) manufactured by Showa Denko K.K.) are mixed to prepare coating liquid (1). The polyamic acid solution and the carbon nanotubes are mixed such that a ratio of the carbon nanotubes to a total volume of and the carbon nanotubes and the solid contents in a case where the polyamic acid solution is cured is 20% by volume.

Formation of First Coating Film

An outer circumferential surface of a cylindrical mold (a diameter of 118 cm) made of aluminum is coated with the coating liquid (1) using a flow-coating method, and the coating liquid (1) is dried at a temperature of 150° C. to form a first coating film. The coating amount of the coating liquid (1) is adjusted such that the thickness of the first layer shown in Table 1 is obtained.

Formation of Second Coating Film

The axial direction of the cylindrical mold including the first coating film is made parallel to the direction of gravity, and the cylindrical mold is dipped into the coating liquid (1).

After that, the cylindrical mold is pulled up at a speed of 1 m/min, and is dried at a temperature of 100° ° C. to form a second coating film. The coating amount of the coating liquid (1) is adjusted such that the thickness of the second layer shown in Table 1 is obtained.

Firing of First Layer and Second Layer

The cylindrical mold including the first coating film and the second coating film is put in a heating furnace, is heated at a temperature of 200° ° C. for one hour, and is then heated at a temperature of 350° C. for 30 minutes to fire the first layer and the second layer.

The cylindrical mold under the first layer is pulled out to obtain a fixing belt including the first layer and the second layer (the tubular fixing member according to the present exemplary embodiment). The average thickness and thermal conductivity of each of the first layer and the second layer is shown in Table 1.

Comparative Example 1

A manner identical to the manner of Example 1 is used but a coating method for the coating liquid (1) is changed from dip coating to a flow-coating method in the formation of the second coating film to manufacture a fixing belt.

Comparative Example 2

A manner identical to the manner of Example 1 is used but a coating method for the coating liquid (1) is changed from a flow-coating method to dip coating in the formation of the first coating film to manufacture a fixing belt.

Examples 2 to 8

A manner identical to the manner of Example 1 is used but the amount of the carbon nanotubes contained in the coating liquid (1) is changed or the thickness of the first layer or the second layer is changed to manufacture a fixing belt.

Performance Evaluation of Fixing Belt

Temperature Variation of Outer Circumferential Surface

The fixing belt is mounted on a fixing device of an image forming apparatus Versant 3100 Press (manufactured by FUJIFILM Business Innovation Corp.). After a hundred sheets of A4 plain paper pass in an environment at a temperature of 23° C., the temperature of the outer circumferential surface of the fixing belt is measured at a total of 20 points, that is, at 5 points arranged at regular intervals in an axial direction of the fixing belt at each of four points arranged at intervals of 90° in a circumferential direction. A difference between the highest temperature and the lowest temperature is calculated, and is classified as follows. Results are shown in Table 1.

A: a difference between the highest temperature and the lowest temperature is 5° C. or less.

B: a difference between the highest temperature and the lowest temperature is higher than 5° C. and 10° C. or less.

C: a difference between the highest temperature and the lowest temperature is higher than 10° C.

Density Variation of Image

The fixing belt is mounted on a fixing device of an image forming apparatus Versant 3100 Press (manufactured by FUJIFILM Business Innovation Corp.). A hundred sheets of A4 plain paper each of which includes a solid black image (an image density of 100%) formed on the entire surface are continuously output in an environment at a temperature of 23° ° C. Image density is measured on the last sheet at 20 points (at 5 points arranged at substantially regular intervals in a longitudinal direction of A4 paper at each of four points arranged at substantially regular in a width direction) using a reflective spectrodensitometer X-Rite939 (an aperture diameter of 4 mm, X-Rite, Inc.) A difference between the maximum density and the minimum density is calculated, and is classified as follows. Results are shown in Table 1.

A: a difference between the maximum density and the minimum density is 0.015 or less.

B: a difference between the maximum density and the minimum density is higher than 0.015 and 0.030 or less.

C: a difference between the maximum density and the minimum density is higher than 0.030.

TABLE 1

| | First layer | | | | | Second layer | | | | |
|---|---|---|---|---|---|---|---|---|---|---|
| | Average thickness | Filler Content | Thermal conductivity | | | Average thickness | Filler Content | Thermal conductivity | | |
| | T1 μm | % by volume | λ1x | λ1y W/m · K | λ1z | T2 μm | % by volume | λ2x | λ2y W/m · K | λ2z |
| Comparative Example 1 | 50 | 20 | 0.8 | 0.8 | 1.2 | 30 | 20 | 0.8 | 0.8 | 1.2 |
| Comparative Example 2 | 50 | 20 | 1.2 | 0.8 | 0.8 | 30 | 20 | 1.2 | 0.8 | 0.8 |
| Example 1 | 50 | 20 | 0.8 | 0.8 | 1.2 | 30 | 20 | 1.2 | 0.8 | 0.8 |
| Example 2 | 50 | 1 | 0.3 | 0.3 | 0.6 | 30 | 1 | 0.6 | 0.3 | 0.3 |
| Example 3 | 50 | 10 | 0.6 | 0.6 | 0.8 | 30 | 10 | 0.8 | 0.6 | 0.6 |
| Example 4 | 50 | 50 | 1.2 | 1.2 | 1.6 | 30 | 50 | 1.6 | 1.2 | 1.2 |
| Example 5 | 50 | 60 | 1.4 | 1.4 | 2.0 | 30 | 60 | 2.0 | 1.4 | 1.4 |
| Example 6 | 99 | 20 | 0.8 | 0.8 | 1.2 | 1 | 20 | 1.2 | 0.8 | 0.8 |
| Example 7 | 75 | 20 | 0.8 | 0.8 | 1.2 | 25 | 20 | 1.2 | 0.8 | 0.8 |
| Example 8 | 50 | 20 | 0.8 | 0.8 | 1.2 | 50 | 20 | 1.2 | 0.8 | 0.8 |

| | | | | | Performance evaluation | |
|---|---|---|---|---|---|---|
| | T2/(T1 + T2) × 100 % | Satisfaction of requirements | | | Temperature variation of outer peripheral surface | Temperature variation of image |
| | | Requirement (1) | Requirement (2) | Requirement (3) | | |
| Comparative Example 1 | 37.5 | ○ | x | x | C | C |
| Comparative Example 2 | 37.5 | x | x | ○ | C | C |
| Example 1 | 37.5 | ○ | ○ | ○ | A | A |
| Example 2 | 37.5 | ○ | ○ | ○ | B | B |
| Example 3 | 37.5 | ○ | ○ | ○ | A | A |
| Example 4 | 37.5 | ○ | ○ | ○ | A | A |
| Example 5 | 37.5 | ○ | ○ | ○ | A | A |
| Example 6 | 1 | ○ | ○ | ○ | A | A |
| Example 7 | 25 | ○ | ○ | ○ | A | A |
| Example 8 | 50 | ○ | ○ | ○ | B | B |

The tubular fixing member, the fixing device, and the image forming apparatus according to the exemplary embodiments of the present disclosure include the following aspects.

((((1))))

A tubular fixing member comprising:

a first layer; and a second layer that is disposed in contact with an outer circumferential side of the first layer, wherein in a case where thermal conductivities of the first layer in an axial direction, a circumferential direction, and a thickness direction are denoted by λ1x, λ1y, and λ1z, respectively, and thermal conductivities of the second layer in the axial direction, the circumferential direction, and the thickness direction are denoted by λ2x, λ2y, and λ2z, respectively, the following requirements (1), (2), and (3) are satisfied, $$\text{Requirement (1): } \lambda 1x < \lambda 1z \text{ and } \lambda 1y < \lambda 1z$$

$$\text{Requirement (2): } \lambda 1z > \lambda 2z$$

$$\text{Requirement (3): } \lambda 2x > \lambda 2y \text{ and } \lambda 2x > \lambda 2z.$$

(((2)))

The tubular fixing member according to (((1))), wherein the second layer is thinner than the first layer.

((((3))))

The tubular fixing member according to (((1))) or (((2))), wherein a ratio of a thickness of the second layer to a total thickness of the first and second layers is 1% or more and less than 10%.

((((4))))

The tubular fixing member according to any one of (((1))) to (((3))), wherein the first layer contains a resin and a filler, and a volume ratio of the filler to the first layer is 0.1% by volume or more and 60% by volume or less.

((((5))))

The tubular fixing member according to any one of (((1))) to (((4))), wherein the second layer contains a resin and a filler, and a volume ratio of the filler to the second layer is 0.1% by volume or more and 60% by volume or less.

(((6)))

A fixing device comprising:

a first rotating body; and a second rotating body that is disposed in contact with an outer surface of the first rotating body, wherein at least one of the first rotating body or the second rotating body is the tubular fixing member according to any one of (((1))) to (((5))), and a recording medium having a surface on which a toner image is formed passes through a contact portion between the first rotating body and the second rotating body and the toner image is fixed.

(((7)))

An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to (((6))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tubular fixing member comprising:

a first layer; and a second layer that is disposed in contact with an outer circumferential side of the first layer, wherein in a case where thermal conductivities of the first layer in an axial direction, a circumferential direction, and a thickness direction are denoted by $\lambda 1x$, $\lambda 1y$, and $\lambda 1z$, respectively, and thermal conductivities of the second layer in the axial direction, the circumferential direction, and the thickness direction are denoted by $\lambda 2x$, $\lambda 2y$, and $\lambda 2z$, respectively, the following requirements (1), (2), and (3) are satisfied, $$\lambda 1x<\lambda 1z \text{ and } \lambda 1y<\lambda 1z \quad \text{Requirement (1):}$$

$$\lambda 1z>\lambda 2z \quad \text{Requirement (2):}$$

$$\lambda 2x>\lambda 2y \text{ and } \lambda 2x>\lambda 2z, \quad \text{Requirement (3):}$$

wherein the second layer is thinner than the first layer, and an average thickness of the second layer is in a range of 1 μm to 100 μm.

2. The tubular fixing member according to claim 1, wherein a ratio of a thickness of the second layer to a total thickness of the first and second layers is 1% or more and less than 10%.

3. A fixing device comprising:

a first rotating body; and a second rotating body that is disposed in contact with an outer surface of the first rotating body, wherein at least one of the first rotating body or the second rotating body is the tubular fixing member according to claim 2, and a recording medium having a surface on which a toner image is formed passes through a contact portion between the first rotating body and the second rotating body and the toner image is fixed.

4. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 3 that fixes the toner image to the recording medium.

5. The tubular fixing member according to claim 1, wherein the first layer contains a resin and a filler, and a volume ratio of the filler to the first layer is 0.1% by volume or more and 60% by volume or less.

6. A fixing device comprising:

a first rotating body; and a second rotating body that is disposed in contact with an outer surface of the first rotating body, wherein at least one of the first rotating body or the second rotating body is the tubular fixing member according to claim 5, and a recording medium having a surface on which a toner image is formed passes through a contact portion between the first rotating body and the second rotating body and the toner image is fixed.

7. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 6 that fixes the toner image to the recording medium.

8. The tubular fixing member according to claim 1, wherein the second layer contains a resin and a filler, and a volume ratio of the filler to the second layer is 0.1% by volume or more and 60% by volume or less.

9. A fixing device comprising:

a first rotating body; and a second rotating body that is disposed in contact with an outer surface of the first rotating body, wherein at least one of the first rotating body or the second rotating body is the tubular fixing member according to claim 8, and a recording medium having a surface on which a toner image is formed passes through a contact portion between the first rotating body and the second rotating body and the toner image is fixed.

10. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 9 that fixes the toner image to the recording medium.

11. A fixing device comprising:

a first rotating body; and a second rotating body that is disposed in contact with an outer surface of the first rotating body, wherein at least one of the first rotating body or the second rotating body is the tubular fixing member according to claim 1, and a recording medium having a surface on which a toner image is formed passes through a contact portion between the first rotating body and the second rotating body and the toner image is fixed.

12. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 11 that fixes the toner image to the recording medium.

13. The tubular fixing member according to claim 1, wherein the thermal conductivity of the second layer in the axial direction is in a range of 0.6 W/m·K to 2.0 W/m·K, the thermal conductivity of the second layer in the circumferential direction is in a range of 0.2 W/m·K to 1.4 W/m·K, and the thermal conductivity of the second layer in the thickness direction is in a range of 0.2 W/m·K to 1.4 W/m·K.

* * * * *